United States Patent
Horn et al.

(10) Patent No.: US 8,307,972 B2
(45) Date of Patent: Nov. 13, 2012

(54) FEED AND REMOVAL SYSTEM FOR MACHINE TOOLS

(75) Inventors: Wolfgang Horn, Goppingen (DE); Moshe Israel Meidar, New York, NY (US); Waldemar Haus, Winnenden (DE)

(73) Assignee: MAG IAS GmbH, Goppingen (DE)

( * ) Notice: Subject to any disclaimer, the term of this patent is extended or adjusted under 35 U.S.C. 154(b) by 276 days.

(21) Appl. No.: 12/867,546

(22) PCT Filed: Dec. 18, 2008

(86) PCT No.: PCT/EP2008/010795
§ 371 (c)(1),
(2), (4) Date: Aug. 13, 2010

(87) PCT Pub. No.: WO2009/100751
PCT Pub. Date: Aug. 20, 2009

(65) Prior Publication Data
US 2010/0329829 A1   Dec. 30, 2010

(30) Foreign Application Priority Data
Feb. 14, 2008   (DE) .......................... 10 2008 009 090

(51) Int. Cl.
*B23Q 1/66* (2006.01)
*B23Q 7/14* (2006.01)
(52) U.S. Cl. ................................ 198/346.2; 414/222.12
(58) Field of Classification Search ................ 198/346.1, 198/346.2; 414/222.01, 222.07, 222.09, 414/222.1, 222.12, 226.05
See application file for complete search history.

(56) References Cited

U.S. PATENT DOCUMENTS

| 6,098,269 A | * | 8/2000 | Albus et al. ........................ 29/564 |
| 2004/0234363 A1 | * | 11/2004 | Schwarz et al. ............ 414/222.1 |
| 2004/0238323 A1 | * | 12/2004 | Abbestam et al. ......... 198/346.2 |
| 2005/0061612 A1 | | 3/2005 | Grob et al. |
| 2005/0063799 A1 | * | 3/2005 | Larson et al. ................. 414/217 |
| 2005/0163600 A1 | | 7/2005 | Grob et al. |
| 2008/0016669 A1 | * | 1/2008 | Migliore ......................... 29/430 |

FOREIGN PATENT DOCUMENTS

| DE | 4340522 A1 | 6/1995 |
| DE | 10356536 A1 | 7/2005 |
| DE | 102006009136 A1 | 8/2007 |
| EP | 0180829 A2 | 5/1986 |
| EP | 0358928 A2 | 3/1990 |
| EP | 1484132 A2 | 12/2004 |
| EP | 1488884 A2 | 12/2004 |

OTHER PUBLICATIONS

International Search Report, PCT/EP2008/010795, Form PCT/ISA/210, mailed May 11, 2009, 4 pages.
German Examination Report, DE10 2008 009 090.5-14, dated Aug. 29, 2008, 3 pages.

* cited by examiner

*Primary Examiner* — Mark A Deuble
(74) *Attorney, Agent, or Firm* — Reising Ethington P.C.

(57) ABSTRACT

A feed and removal system for a machine tool has a supply device and a removal device for workpieces. Arranged at the front side of the machine tool are loading arms and unloading arms, which are pivotable about vertical pivot axes and, at their free ends, carry workpiece carrying devices.

8 Claims, 4 Drawing Sheets

FEED AND REMOVAL SYSTEM FOR MACHINE TOOLS

FIELD

The invention relates to a feed and removal system for machine tools.

BACKGROUND

A system of this type is known from DE 103 56 536 A1, in which mutually adjacent machine tools are provided. Provided between these machine tools are workpiece grippers, which are moveable on guides between the machine tools. The grippers are movable to supply and remove machined and unmachined workpieces into the workspaces of the machine tools.

It is known from EP 1 488 884 A2 to provide a continuous transport path for transporting workpieces which are to be machined and have been machined in front of machine tools arranged next to one another. By means of this transport path, the workpieces are supplied by means of a supply conveying path or a removal conveying path to the respective machine tool or removed therefrom. These conveying paths are arranged one above the other in various planes.

It is known from DE 43 40 522 A1, to use pivot arms to change the workpiece in a coating system for disc-shaped substrates.

SUMMARY

The invention is based on the object of providing a feed and removal system for machine tools, which can be used highly flexibly and leads to a great reduction in the cycle times on the feed and removal side.

This object is achieved according to the invention by a feed and removal system for machine tools,
 with at least one machine tool, which
   has a front side,
   at least one workpiece receiver and
   a loading and unloading position for feeding the workpiece receiver with unmachined workpieces and to remove machined workpieces from the workpiece receiver,
 with a linearly configured supply device for supplying unmachined workpieces in a transport direction into the region of the front side,
 with a linearly configured removal device for removing machined workpieces in the transport direction, the supply device and the removal device being arranged vertically one above the other and the loading and unloading position being arranged vertically between the supply device and the removal device,
 with a loading arm, which is associated with the supply device and the workpiece receiver, and which loading arm is vertically displaceable, rigidly configured and pivotable about a vertical pivot axis and provided with a workpiece carrying device,
 with an unloading arm, which is associated with the workpiece receiver and the removal device, an which loading arm is vertically displaceable, rigidly configured, pivotable about a vertical pivot axis and provided with a workpiece carrying device and
 with a lifting device which is vertically displaceable between the supply device and the removal device to selectively close, in each case, a gap in the supply device and the removal device.

The loading and unloading arms provided at the respective machine tool, which have two pivot axes and a vertical displacement possibility, are used to receive an unmachined workpiece from a supply device and to feed the machine tool, while the unloading arm is used to remove the machined workpiece from the machine tool. The measures according to the invention can be used for serial machining processes, in which, in other words, a final machining of a workpiece takes place, in each case, on a machine tool. The measures according to the invention can, however, also be used for parallel machining processes, in which machine tools arranged next to one another carry out the same machining process on different workpieces.

Further features, advantages and details of the invention emerge from the following description of embodiments of the invention with the aid of the drawings.

DESCRIPTION OF THE PREFERRED EMBODIMENT

Figure 1:
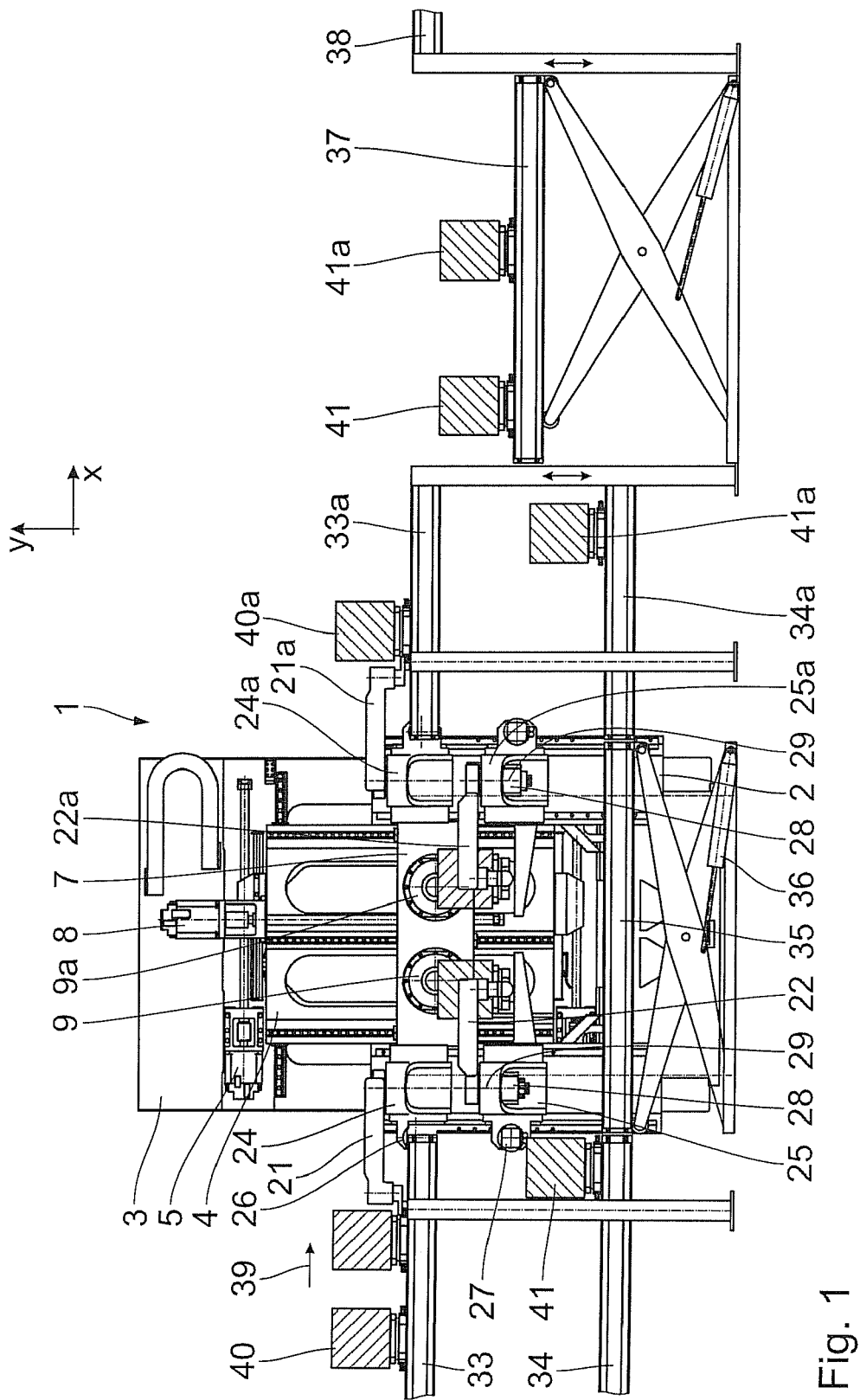
FIG. 1 shows a first embodiment of a system configured for serial machining processes according to the invention, in a front view.
Figure 2:
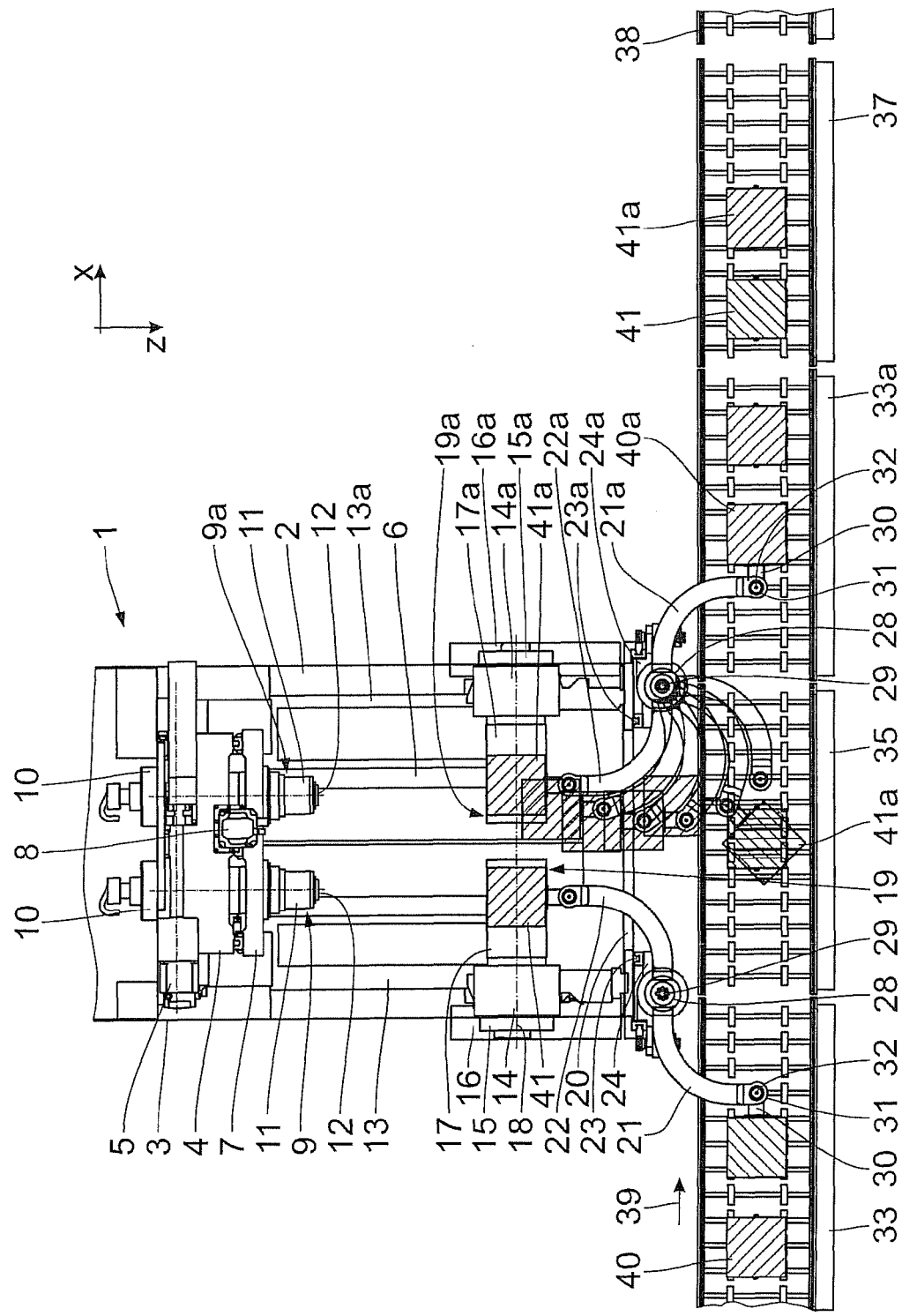
FIG. 2 shows the system according to FIG. 1, in a plan view.

FIGS. 1 and 2 show a machine tool 1, which has a machine bed 2 and a stand 3 projecting therefrom. An x-slide 4, which is displaceable in the horizontal x-direction, is displaceably guided on the stand 3, the displacement drive of which slide takes place in the x-direction by means of an x-motor 5. A y-slide 7, the displacement movements of which are carried out by a y-motor 8, is displaceably guided in the vertical y-direction at the front side of the x-slide 4 facing a workspace 6. Two spindle units 9, 9a extending in the z-direction are provided non-displaceably in the z-direction on the y-slide 7. The spindle units 9, 9a in each case have a spindle 11 which is rotatably drivable by a spindle motor 10 and has a tool receiver 12 at its end facing the workspace 6. The z-direction and therefore the direction of the spindles 11 is perpendicular to the x-y-plane.

Located on the lower side of the workspace 6 on the machine bed 2 are two z-guides 13, 13a, on which a workpiece slide 14, 14a is in each case arranged mirror-symmetrically with respect to one another and is displaceable in the z-direction. The displacement movements of the respective workpiece slide 14, 14a in each case take place by means of linear motors 15, 15a, which are in each case supplied with current by a cable trailing device 16, 16a.

Provided on the workpiece slide 14, 14a, in each case, is a workpiece receiver 17, 17a, which may, in each case, be pivotable about a horizontal A-axis 18. Each workpiece slide 14, 14a is movable between a loading and unloading position 19 or 19a shown in FIG. 2 and a machining position, not shown, in front of the respective spindle unit 9, 9a. To the extent that the machine tool 1 is described until now, it is basically known and conventional in practice.

Upper loading arms 21, 21a and lower unloading arms 22, 22a are arranged at the front side 20 of the machine tool 1 adjacent to the loading and unloading position 19 or 19a, the arms 21, 22 or 21a, 22a arranged one above the other being identical. The loading arms 21, 21a associated with one another and the unloading arms 22, 22a are arranged mirror-symmetrically with respect to one another. All the arms 21 to 22a are curved approximately in a quarter circle shape, in other words bent through 90°.

The loading arms 21, 21a are vertically displaceably mounted, in other words in the y-direction, on vertical rails 23, 23a by means of upper lifting slides 24, 24a. Lower lifting slides 25, 25a are vertically displaceably mounted on the same rails 23, 23a and carry the unloading arms 22 or 22a. The lifting slides 24, 24a and 25, 25a are in each case driven by means of a lifting motor 26. Each arm 21, 21a and 22, 22a is pivotably mounted on the lifting slide 24, 24a and 25, 25a carrying it by means of a first pivot motor 28 about a first vertical pivot axis 29. Provided at the free end of each arm 21, 21a and 22, 22a is in turn a workpiece carrying device 30, which may be configured as a workpiece gripper or as a so-called workpiece tray. The workpiece carrying device 30 is pivotable relative to the corresponding arm 21, 21a or 22, 22a by means of a second pivot motor 31 about a second vertical pivot axis 32.

As can also be inferred from FIGS. 1 and 2, a main supply device 33 configured as a roller belt and an auxiliary supply device 33a also configured as a roller belt are in each case arranged in front of the front side 20 of the machine tool 1. Provided below the supply devices 33, 33a are removal devices 34, 34a, which are also configured as roller belts and which—similarly to the supply devices 33, 33a—align with one another. The workpiece receivers 17, 17a are arranged vertically between the supply devices 33, 33a and the removal devices 34, 34a.

A lifting device 35 also configured as a roller belt is arranged in front of the machine tool 1 and is displaceable by means of a lifting drive 36 between two positions, namely an upper position, in which it connects the two supply devices 33, 33a to one another, and a lower position, in which it—in accordance with the view in FIGS. 1 and 2—connects the removal devices 34, 34a to one another. The vertical movement of the lifting device 35 is always possible when all the arms 21, 21a and 22, 22a are pivoted into the workspace 6. The lifting device 35 is thus used as a bridging device for the gaps between the devices 33 and 33a and 34 and 34a.

Arranged downstream of the auxiliary supply device 33a and the removal device 34a is a further lifting device 37, which is vertically displaceable with the removal device 34a, on the one hand, and a downstream further main supply device 38 located at the height of the auxiliary supply device 33a. This further main supply device 38 leads to a downstream further machine tool, not shown, on which further machining operations are carried out.

The mode of operation is as follows:

With arms 21, 21a, 22, 22a pivoted into the workspace 6 and the lifting device 35 moved up—in FIGS. 1 and 2 from the left—in the transport direction 39, unmachined workpieces 40, which are shown in the drawing hatched with continuous lines, are brought up such that, on the one hand, workpieces 40 are present on the main supply device 33 and likewise unmachined workpieces 40 are present on the auxiliary supply device 33a. The latter are conveyed through from the main supply device 33 via the lifting device 35 to the auxiliary supply device 33a.

Once the lifting device 35 has moved down into its lower position shown in FIGS. 1 and 2, the loading arms 21, 21a are pivoted into their position pivoted out of the workspace 6, in which position they can grasp, by means of the respective workpiece carrying devices 30, the respective next workpiece 40 located on the main supply device 33 or the workpiece 40a located on the auxiliary supply device 33a. The second pivot motors 31 in this case pivot the respective carrying device 30 relative to the loading arm 21 and 21a in such a way that the carrying device 30 when the respective loading arm 21 and 21a is pivoted comes precisely into engagement with the workpiece 40 and 40a to be machined. At the same time, the carrying devices 30 of the unloading arms 22, 22a grasp the machined workpieces 41, 41a located on the workpiece receivers 17, 17a. By corresponding activation of the first pivot motors 28, the unloading arms 22, 22a with the workpieces 41, 41a are pivoted out of the workspace 6, the respective second pivot motor 31 in turn being activated in such a way that the removal of the machined workpiece 41a from the workpiece receiver 17 and 17a takes place without tilting, as shown in FIG. 2 for the unloading arm 22a. The unloading arms 22, 22a pivoted out of the workspace 6 are moved downward by means of the lower lifting slides 25, 25a, so the machined workpieces 41 and 41a can be deposited on the removal devices 34, 34a. The machined workpiece 41 is then moved by the lifting device 35 onto the removal device 34a, where the two machined workpieces 41 and 41a are then brought by the further lifting device 37 onto the further main supply device 38, from where they are transported for a further machining process to a further machine tool.

While the unloading arms 22, 22a with the machined workpieces 41, 41a are pivoted in the manner described from the workspace 6, the unmachined workpieces 40, 40a, which are located, in the manner already described on the workpiece carrying devices 30 of the loading arms 21, 21a, are pivoted through 180° into the workspace 6, the carrying devices 30 and therefore also the unmachined workpieces 40, 40a being brought by corresponding activations of the second pivot motors 31 into the correct position to the workpiece receivers 17, 17a. During the already described lowering of the unloading arms 22, 22a with the machined workpieces 41, 41a, the loading arms 21, 21a are now lowered by a corresponding drive of the upper lifting slides 24, 24a into the loading and unloading position 19 and 19a, so the workpieces 40, 40a can be received by the workpiece receivers 17, 17a. Workpieces 40, 40a are moved by means of the workpiece slide 14 and 14a into the machining position in front of the spindle unit 9, 9a and machined there. In the meantime, the arms 21, 21a and 22, 22a are again moved into their respective upper waiting position in the workspace 6. The lifting device 35 is moved into its upper position, in which an unmachined workpiece 40a is conveyable through to the auxiliary supply device 33a.

During the receiving and depositing of unmachined and machined workpieces 40, 40a and 41, 41a, the arms 21, 21a and 22, 22a make slight vertical movements, specifically by means of the lifting slides 24, 24a and 25, 25a.

As already mentioned, a serial machining process takes place in the embodiment according to FIGS. 1 and 2, in each case, which means that a machining of a workpiece 40 or 40a is taking place only on one machine tool 1, and that the machined workpiece 41 or 41a is then further machined in a different manner on a downstream machine tool, not shown.

Figure 3:
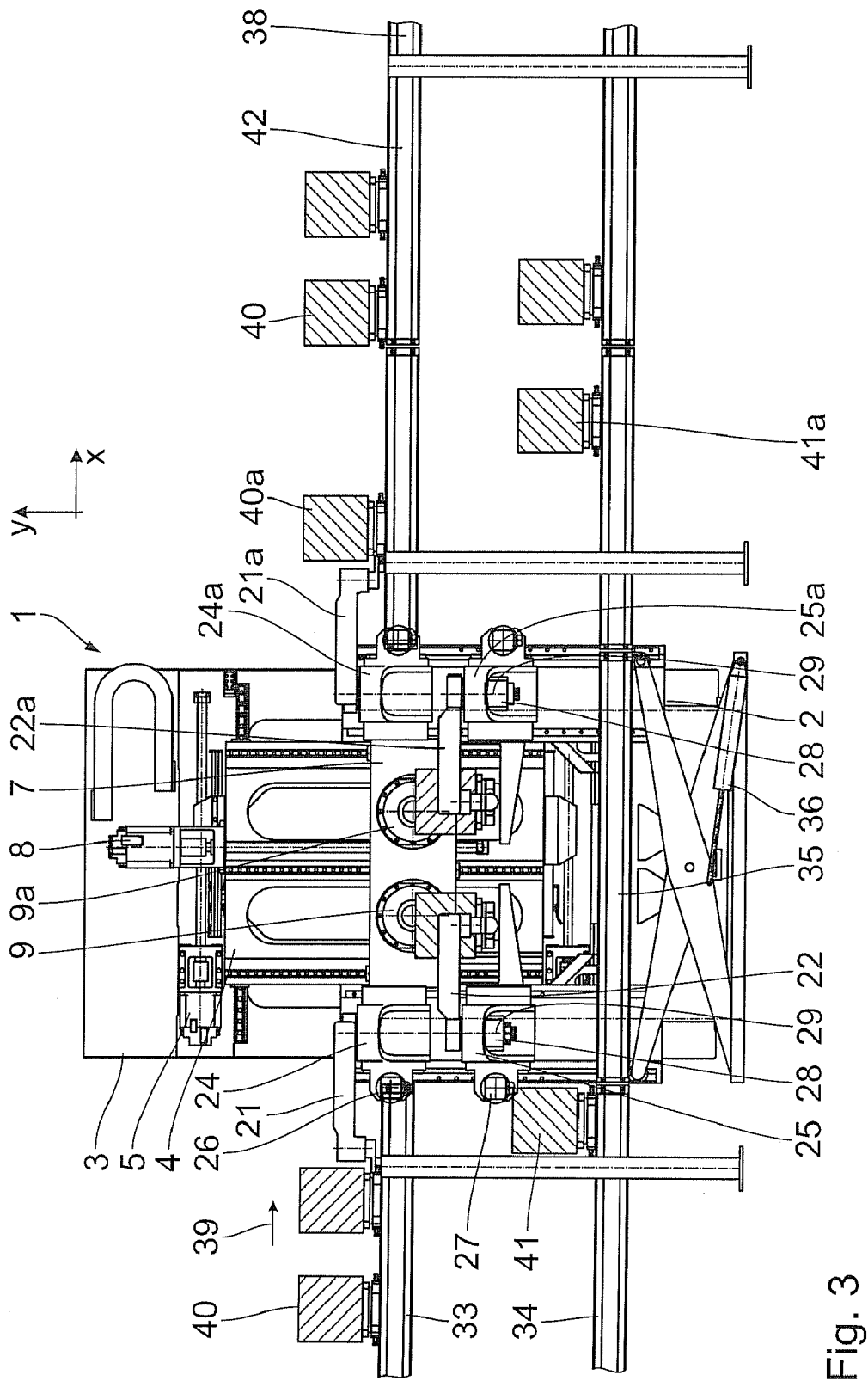
FIG. 3 shows a second embodiment of a system designed for parallel machining processes according to the invention in a front view.
Figure 4:
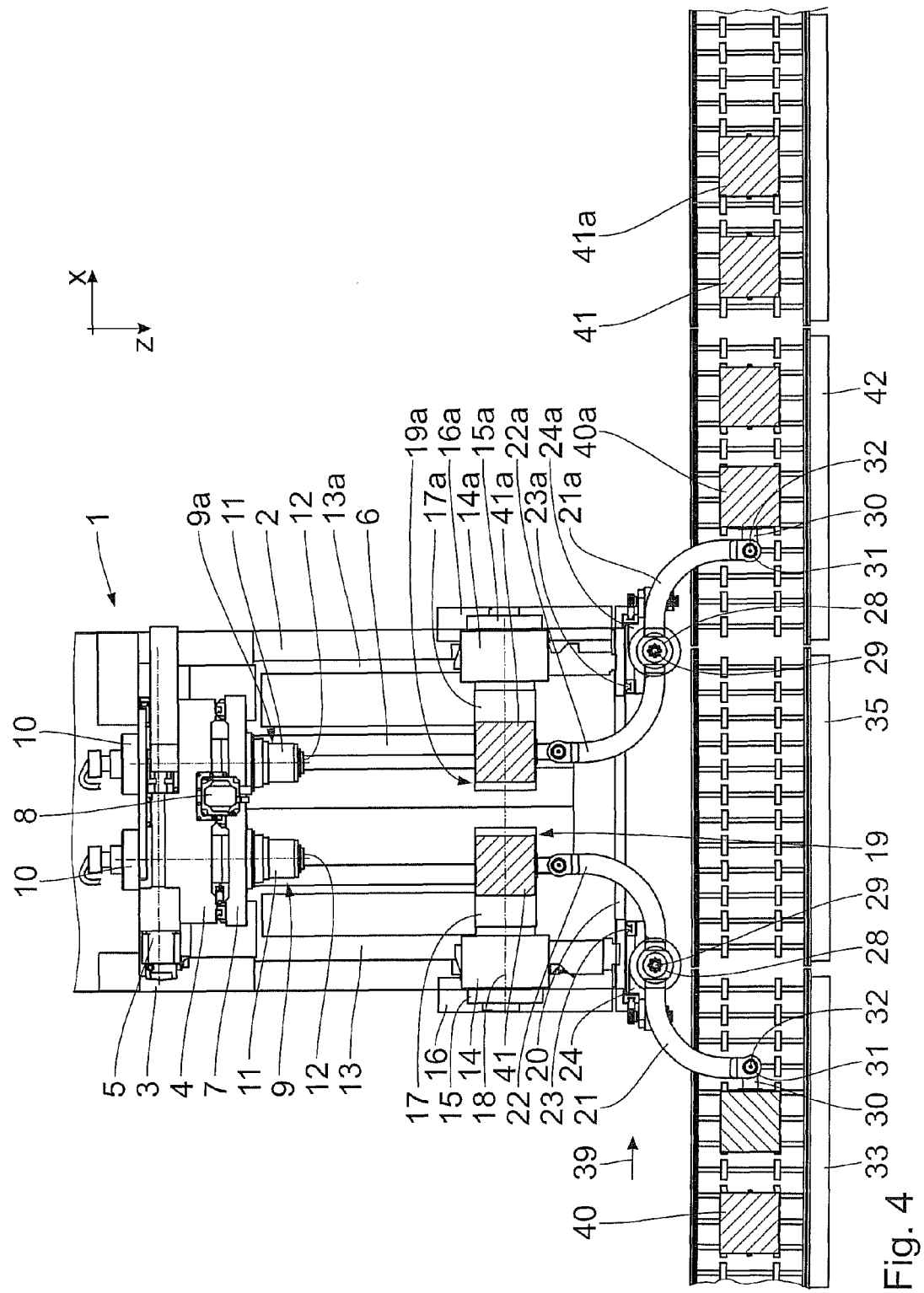
FIG. 4 shows the system according to FIG. 3 in a plan view.

In contrast to this, a parallel machining takes place in the embodiment according to FIGS. 3 and 4. In other words, the same respective machining process takes place in parallel with one another on a plurality of identical machine tools, an optimization of the machine utilization being achieved by the workpiece supply and removal. The machine tools 1 are basically the same as in the embodiment according to FIGS. 1 and 2, so another description is dispensed with. There are only differences with regard to the transport of the workpieces 40, 40a and 41, 41a. Instead of the auxiliary supply device 33a, an onward guiding main supply device 42 is provided, which is used to transport unmachined workpieces 40 and 40*a* to the next downstream machine tool. With the already described lifting device 35 moved up, not only is the workpiece 40*a* to be machined by the spindle unit 9*a* conveyed by the lifting device 35, but the unmachined workpieces 40 and 40*a*, which are to be machined in parallel on downstream machine tools, are also conveyed through onto the main supply device 42.

The removal device 34 continuously conveys onward, so, in front of each subsequent machine tool, the workpieces 41 and 41*a* machined there are deposited thereon by means of the corresponding lifting device 35 and finally transported away. The further lifting device 37 from the embodiment according to FIGS. 1 and 2 is thus dispensed with.

What is claimed is:

1. A feed and removal system for machine tools,
    with at least one machine tool which
        has a front side,
        at least one workpiece receiver and
        a loading and unloading position for feeding the workpiece receiver with unmachined workpieces and to remove machined workpieces from the workpiece receiver,
    with a linearly configured supply device for supplying unmachined workpieces in a transport direction into the region of the front side,
    with a linearly configured removal device for removing machined workpieces in the transport direction, the supply device and the removal device being arranged vertically one above the other and the loading and unloading position being arranged vertically between the supply device and the removal device,
    with a loading arm, which is associated with the supply device and the workpiece receiver, and which loading arm is vertically displaceable, rigidly configured and pivotable about a vertical pivot axis and provided with a workpiece carrying device,
    with an unloading arm, which is associated with the workpiece receiver and the removal device, and which loading arm is vertically displaceable, rigidly configured, pivotable about a vertical pivot axis and provided with a workpiece carrying device and
    with a lifting device which is vertically displaceable between the supply device and the removal device to selectively close, in each case, a gap in the supply device and the removal device.

2. A feed and removal system according to claim 1, wherein at least one of the loading arms and the unloading arms are curved.

3. A feed and removal system according to claim 2, wherein at least one of the loading arms and the unloading arms are curved approximately in a quarter circle shape.

4. A feed and removal system according to claim 1, wherein at least one of the loading arms and the unloading arms are vertically displaceable by means of lifting slides.

5. A feed and removal system according to claim 4, wherein the lifting slides are in each case displaceably arranged one above the other on a common rail.

6. A feed and removal system according to claim 1, wherein the workpiece carrying device is pivotable relative to at least one of the loading arm and the unloading arm by means of a pivot motor.

7. A feed and removal system according to claim 1, wherein the supply device, the removal device and the lifting device are configured as roller belts.

8. A feed and removal system for a machine tools with two workpiece receivers according to claim 1, wherein loading arms and unloading are arranged on the front side (20) of the machine tool.

\* \* \* \* \*